United States Patent Office.

RAPHAEL MELDOLA, OF HACKNEY WICK, COUNTY OF MIDDLESEX, ENGLAND.

MANUFACTURE OF BLUE COLORING-MATTERS.

SPECIFICATION forming part of Letters Patent No. 263,420, dated August 29, 1882.

Application filed June 14, 1882. (No specimens.) English Provisional Protection, dated May 24, 1882, No. 2,471.

*To all whom it may concern:*

Be it known that I, RAPHAEL MELDOLA, a citizen of England, residing at Hackney Wick, in the county of Middlesex, England, chemist, have invented a new and useful Manufacture of Blue Coloring-Matters, of which the following is a specification.

My present invention relates to a new method for manufacturing blue coloring-matters by the action of suitable oxidizing agents upon the products of the reduction of certain diazo colors derived from the amidosulphonic acids of naphthaline and tertiary monamines—such as dimethylaniline, diethylaniline, methyldiphenylamine, &c.—in the presence of sulphureted hydrogen in accordance with the well-known reaction discovered by Lauth.

In carrying out this invention I take one of the isomeric amidonaphthalinesulphonic acids known to chemists and convert it into a diazosulphonic acid by acting upon it with the necessary quantity of nitrous acid, or of a nitrite in the presence of a mineral acid. This diazosulphonic acid is then allowed to act upon dimethylaniline, diethylaniline, or other tertiary monamines, so as to produce diazo colors, of which the formulæ are: $C_{10}H_6.HSO_3.N = N.C_6H_4.N\genfrac{}{}{0pt}{}{CH_3}{CH_3}$, $C_{10}H_6.HSO_3.N = N.C_6H_4.N\genfrac{}{}{0pt}{}{C_2H_5}{C_2H_5}$, &c. These diazo colors are all orange dyestuffs, and by preference I use the compounds derived from those amidosulphonic acids of naphthaline containing the amidogen in the "beta" position, as is well understood by chemists, owing to the greater facility with which such amidosulphonic acids form the diazo colors above mentioned.

The following is the process for carrying out the manufacture of the blue coloring-matter according to my invention.

First operation: Ten parts, by weight, of the amidonaphthalinesulphonic acid prepared either by the action of sulphuric acid upon betanaphthylamine or by reducing the nitrosulphonic acids obtained by the action of nitric acid upon the betanaphthalinesulphonic acid, as discovered by Clève, are suspended in cold water acidulated with muriatic acid, and a solution of nitrite of soda is gradually added in such quantity as shall contain 3.09 parts, by weight, of pure nitrite. The solutions, after being mixed, are kept well cooled, and are allowed to stand for some hours, so as to form the diazosulphonic acid or mixture of isomeric acids, as mentioned. When the diazotizing operation is complete, which is the case in about two hours, there is added a solution containing 5.4 parts, by weight, of dimethylaniline or 6.7 parts of diethylaniline dissolved in the necessary quantity of muriatic acid, and after standing for some hours the diazo color begins to separate, and is completely thrown out by the addition of ammonia to the mixed solutions. Second operation: The ammoniacal solution containing the ammonium-salt of the diazo color in suspension is mixed with a solution of yellow sulphide of ammonium, and the mixture kept at a temperature of 80° to 90° centigrade till the diazo color is completely reduced, as is ascertained by the mixture becoming colorless. The reduction is much hastened by the addition of a small quantity of zinc-dust. The solution is now rapidly cooled and made acid by means of muriatic acid, and the sulphur and amidonaphthalinesulphonic acid thus precipitated is removed by filtration. The solution is then oxidized by ferric chloride or other suitable oxidizing substances till the smell of sulphureted hydrogen is destroyed, when the coloring-matter at once forms, and is precipitated by the addition of chloride of zinc and common salt in the usual way. The amidonaphthalinesulphonic acid is freed from sulphur by dissolving it in a weak solution of alkali, filtering and precipitating by muriatic acid, and the acid thus recovered can be again used for the manufacture of the blue dye-stuff. The coloring-matter precipitated in the manner above described is collected on filters in order to remove a red coloring-matter which remains in the solution, and is purified by dissolving in hot water, filtering, and again precipitating by zinc chloride and common salt. When collected it can be dried, and is then ready for use; or it can be employed in the form of a paste. It dyes silk and wool from a neutral or ammoniacal bath of a fine blue shade, and it can be used also for cotton, with or without a mordant, according to the shades required.

The advantage of the method herein described consists in the facility with which the diazo colors above mentioned can be reduced by means of the sulphides of ammonium or sodium, and the ease with which the amidonaphthalinesulphonic acids employed, can be recovered for use.

I wish it further to be understood that the operations above described may be varied in their order of application, and I by no means bind myself to the precise order as above set forth.

I claim as my invention—

The new manufacture of blue coloring-matters by the reduction of the diazo colors formed from the various amidonaphthalinesulphonic acids in conjunction with dimethylaniline and other tertiary monamines by means of a sulphide, with or without the addition of zinc-dust, and the oxidation of the products thus formed by means of ferric chloride or other suitable oxidizing material, substantially as herein described.

In testimony whereof I have signed my name to this specification, in the presence of two subscribing witnesses, this 31st day of May, A. D. 1882.

RAPHAEL MELDOLA.

Witnesses:
OLIVER IMRAY,
JNO. P. M. MILLARD.